(12) United States Patent
Heppler

(10) Patent No.: US 9,518,683 B1
(45) Date of Patent: Dec. 13, 2016

(54) CLEVIS HANGER CONFIGURED FOR MULTIPLE PIPES

(71) Applicant: Darren C. Heppler, Las Vegas, NV (US)

(72) Inventor: Darren C. Heppler, Las Vegas, NV (US)

( * ) Notice: Subject to any disclaimer, the term of this patent is extended or adjusted under 35 U.S.C. 154(b) by 16 days.

(21) Appl. No.: 14/158,692

(22) Filed: Jan. 17, 2014

(51) Int. Cl.
*F16L 3/00* (2006.01)
*F16L 3/02* (2006.01)

(52) U.S. Cl.
CPC .................................... *F16L 3/02* (2013.01)

(58) Field of Classification Search
USPC ........................................................... 248/58
See application file for complete search history.

(56) References Cited

U.S. PATENT DOCUMENTS

| | | | | |
|---|---|---|---|---|
| 429,357 A * | 6/1890 | McBee | | 248/68.1 |
| 948,902 A * | 2/1910 | Noyes | | F16L 3/14 248/59 |
| 1,362,244 A * | 12/1920 | Farley | | F16L 3/133 24/279 |
| 1,586,642 A * | 6/1926 | Arndt | | 248/226.12 |
| 2,339,564 A * | 1/1944 | Goldberg et al. | | 248/62 |
| 2,339,565 A * | 1/1944 | Goldberg et al. | | 248/62 |
| 2,384,440 A | 9/1945 | Carr | | |
| 2,407,217 A | 9/1946 | Banneyer | | |
| 2,714,497 A * | 8/1955 | Denis | | F16L 3/11 248/62 |
| 3,415,474 A * | 12/1968 | Kindorf | | F16L 59/135 248/62 |
| 3,506,227 A * | 4/1970 | Jenkins | | 248/59 |
| 3,517,901 A * | 6/1970 | Jenkins | | F16L 3/14 248/327 |
| 3,565,375 A * | 2/1971 | Babb | | F16L 3/14 248/59 |
| 3,575,367 A * | 4/1971 | Welsh et al. | | 248/59 |
| 3,687,406 A | 8/1972 | Krahe et al. | | |
| 3,744,837 A * | 7/1973 | Foster | | 294/74 |
| 3,866,871 A | 2/1975 | Dupuy, Sr. | | |
| 3,923,277 A * | 12/1975 | Perrault | | F16L 3/00 211/196 |
| 4,019,706 A * | 4/1977 | Weiland, Sr. | | 248/62 |
| 4,098,415 A * | 7/1978 | Mason | | 414/800 |
| 4,245,806 A | 1/1981 | Vangreen | | |
| 4,396,135 A * | 8/1983 | Lundgren | | 224/461 |
| 4,413,799 A * | 11/1983 | Gabriel | | 248/59 |
| 4,960,253 A * | 10/1990 | Perrault | | F16L 3/22 248/68.1 |
| 5,181,680 A * | 1/1993 | Coll | | 248/61 |
| 5,192,039 A * | 3/1993 | Williams | | F16L 59/135 138/107 |
| 5,344,111 A * | 9/1994 | Gantzert | | F24H 9/06 248/146 |
| 5,350,141 A * | 9/1994 | Perrault et al. | | 248/59 |
| 5,593,115 A * | 1/1997 | Lewis | | F16L 3/227 248/200.1 |

(Continued)

*Primary Examiner* — Monica Millner
(74) *Attorney, Agent, or Firm* — FisherBroyles, LLP; Rob L. Phillips

(57) ABSTRACT

Clevis hanger systems including at least an upper bracket configured to connect to one or more support rods each able to receive one or more pipe hangers in various relative positions. I-beam sway bars, spacers and/or vertical plates may be incorporated in the clevis hanger systems as well.

3 Claims, 11 Drawing Sheets

(56) References Cited

U.S. PATENT DOCUMENTS

| | | | |
|---|---|---|---|
| 5,848,770 | A | 12/1998 | Oliver et al. |
| 5,924,655 | A | 7/1999 | Rinderer |
| 6,170,784 | B1* | 1/2001 | MacDonald ......... H05K 7/1448 211/26 |
| 6,505,796 | B1* | 1/2003 | Roth .............................. 248/62 |
| 6,807,791 | B2 | 10/2004 | Herb |
| 7,207,527 | B2 | 4/2007 | Opperthauser |
| 7,284,728 | B2* | 10/2007 | Connolly ........................ 248/62 |
| 7,320,448 | B2* | 1/2008 | Hardtke ......................... 248/62 |
| 7,780,122 | B1* | 8/2010 | Herbers .................. E21F 17/02 248/333 |
| D625,585 | S * | 10/2010 | Kramer ......................... D8/380 |
| 8,523,119 | B1* | 9/2013 | Greer .................... E03D 11/143 248/224.8 |
| 8,567,734 | B2* | 10/2013 | McCoy ................... F16L 3/223 211/186 |
| 8,596,589 | B2* | 12/2013 | Hennon ....................... 248/67.5 |
| 2006/0180713 | A1* | 8/2006 | Olle et al. ....................... 248/58 |
| 2009/0057498 | A1* | 3/2009 | Oh et al. ....................... 248/68.1 |
| 2009/0321587 | A1 | 12/2009 | Thackeray |
| 2012/0318934 | A1* | 12/2012 | Thomas ......................... 248/58 |

\* cited by examiner

CLEVIS HANGER CONFIGURED FOR MULTIPLE PIPES

FIELD OF THE INVENTION

The embodiments of the present invention relate to a clevis hanger system for supporting multiple pipes.

BACKGROUND

Clevis hangers are a type of pipe hanger which often includes a swivel yoke supported by at the top by an adjustable vertical rod. Other clevis hanger types are also available. Clevis hangers are ubiquitous in building structures including homes and commercial establishments. Unfortunately, conventional clevis hangers are limited and often require structures to be designed based on such limitations.

It would be advantageous to develop a clevis hanger system providing additional versatility including support for multiple pipes.

SUMMARY

Accordingly, the clevis hanger systems of the embodiment of the present invention comprise at least an upper bracket configured to receive one or more support rods each able to support one or more pipe hangers.

One embodiment of a clevis hanger system comprises an upper bracket having a support rod connected thereto. Said support rod receiving a lower pipe hanger and upper pipe hanger. With this configuration, a first pipe may be supported by the lower pipe hanger and a second parallel running pipe may be supported by the upper pipe hanger.

Another embodiment of a clevis hanger system comprises an upper bracket having two support rods connected thereto. A first support rod receives a lower pipe hanger while a second support rod receives a pair of pipe hangers in a side-by-side relationship.

Another embodiment, a clevis hanger system comprises an upper bracket, a first pair of vertical slats, a second pair of vertical slats and a pair of intermediary connectors. Multiple pipe hangers are received by multiple support rods.

Another embodiment of a clevis hanger system comprises vertical slats connected to an upper bracket. Multiple support rods are connected to the upper bracket and vertical slats which support multiple pipe hangers.

Another embodiment of a clevis hanger system comprises multiple upper brackets with a first upper inner bracket supporting a first pipe hanger and a second upper outer bracket supporting a second pipe hanger.

Another embodiment of a clevis hanger system comprises a first upper bracket connected to a support rod supporting a first pipe hanger, and a lower bracket which is connected to a second upper bracket which is connected to a support rod which receives a second pipe hanger.

Another embodiment of a clevis hanger system comprises a first upper bracket connected to a support rod which supports a first pipe hanger which supports a second upper bracket which supports a second pipe hanger. In one embodiment, the second upper bracket is connected to the first pipe hanger via a welded coupling.

Another embodiment of a clevis hanger system comprises an upper bracket connected to a support rod which receives a series of rod and loop arrangements which each support an upper bracket which are each connected to a support rod which each receive a pipe hanger.

Another embodiment a clevis hanger system comprises an upper bracket connected to a support rod which receives three pipe hangers in a side-by-side relationship.

Other embodiments incorporate I-beam sway bars, spacers and/or vertical plates as detailed below.

Other variations, embodiments and features of the present invention will become evident from the following detailed description, drawings and claims.

DETAILED DESCRIPTION

Figure 1:
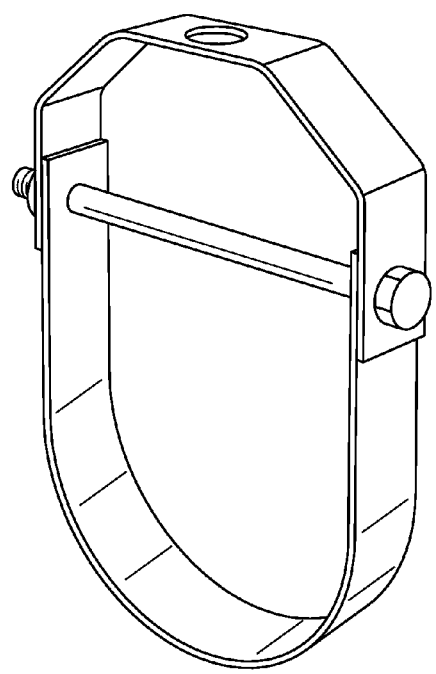
FIG. 1 illustrates a first prior art clevis hanger system.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The components of the embodiments of the present invention may be fabricated of any suitable materials, including plastics, alloys, composites, resins and metals, and may be fabricated using suitable techniques, including molding, casting, machining and rapid prototyping.

Figure 2:
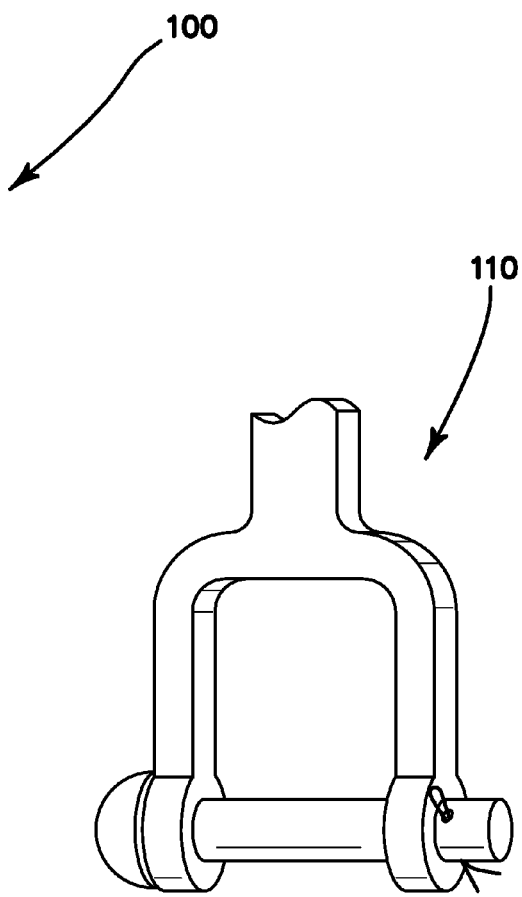
FIG. 2 illustrates a second prior art clevis hanger system.
Figure 3:
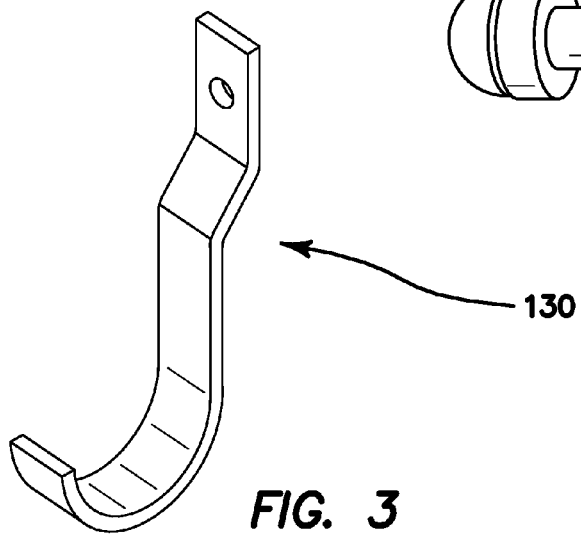
FIG. 3 illustrates a third prior art clevis hanger system.

FIGS. 1-3 show different prior art clevis hanger systems 100, 110 and 120. Each of the prior art clevis hanger systems 100, 110 and 120 is configured to support a single pipe. Conventionally, a series of clevis hangers are attached in a spaced relationship to a rigid ceiling structure such that a pipe may be supported thereby.

Figure 4:
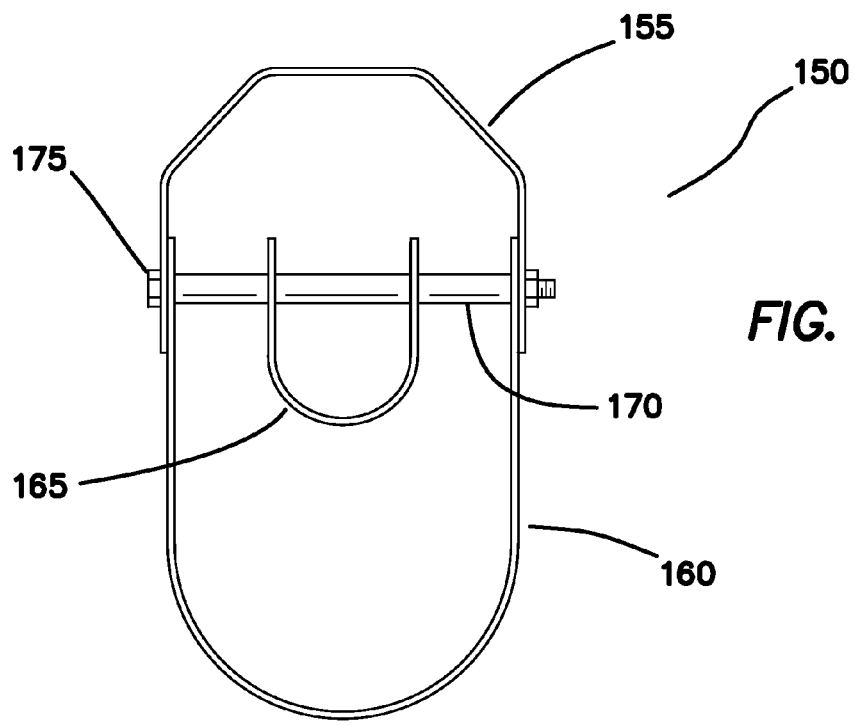
FIG. 4 illustrates a first embodiment of a clevis hanger system according to the embodiments of the present invention.

FIG. 4 shows a first embodiment of a clevis hanger system 150 according to the embodiments of the present invention. The clevis hanger system 150 comprises an upper bracket 155, lower pipe hanger 160, upper pipe hanger 165 and support rod 170. In this embodiment, the support rod 170 receives the lower pipe hanger 160 and inner pipe hanger 165. With this configuration, a first pipe is supported by the lower pipe hanger 160 and a second parallel pipe is supported by the upper pipe hanger 165. In this embodiment, and those described below, nuts 175 or similar connectors are used to attach the support rod 170 to the upper bracket 155 or other article.

Figure 5:
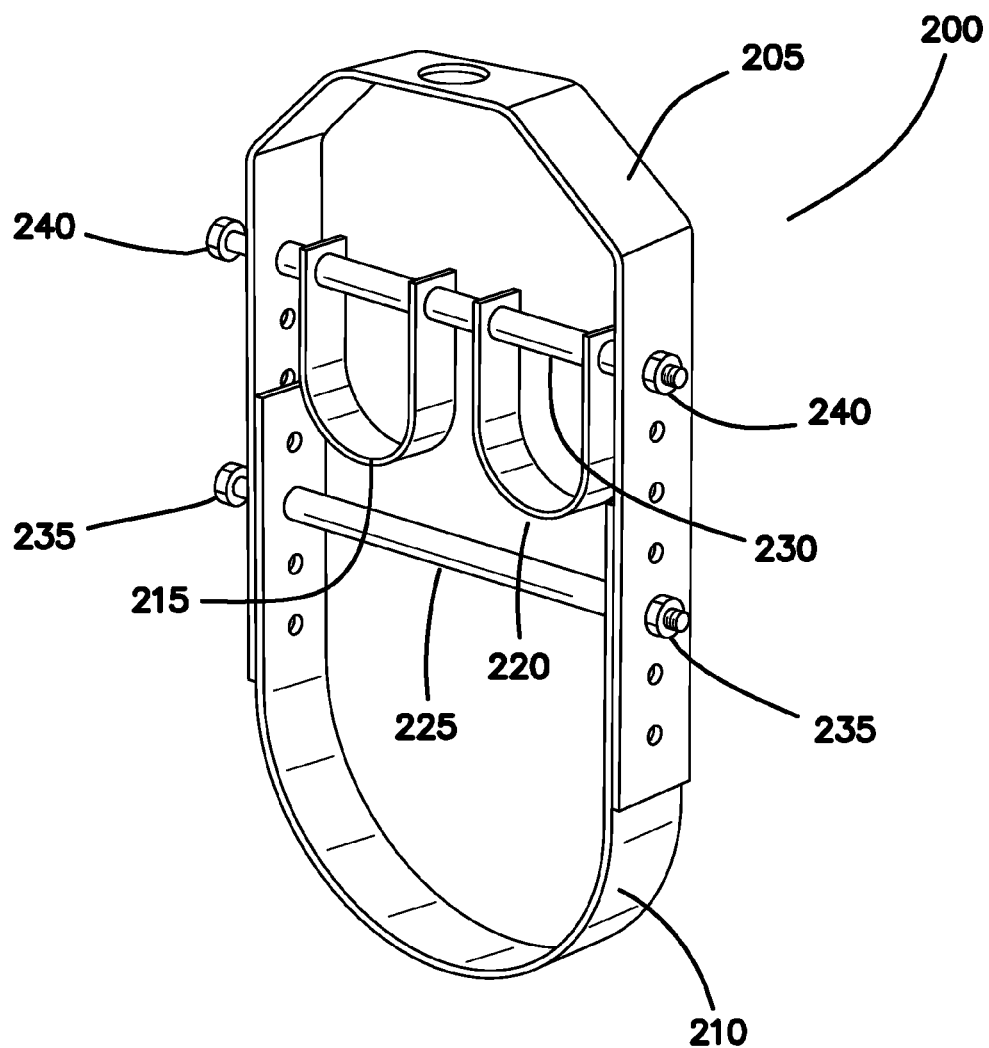
FIG. 5 illustrates a second embodiment of a clevis hanger system according to the embodiments of the present invention.

FIG. 5 shows a second embodiment of a clevis hanger system 200 according to the embodiments of the present invention. The clevis hanger system 200 comprises an upper bracket 205, lower pipe hanger 210, a first upper pipe hanger 215 and a second upper pipe hanger 220. A first support rod 225 receives the lower pipe hanger 210 and a second support rod 230 receives the first upper pipe hanger 215 and the second upper pipe hanger 220 in a side-by-side relationship. Nuts 235 secure the first support rod 225 to the upper bracket 205 while nuts 240 secure the second support rod 230 to the upper bracket 205.

Figure 6:
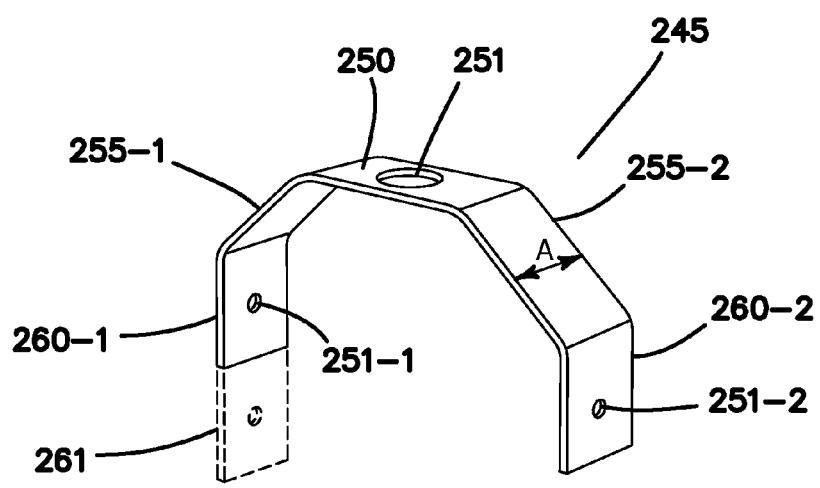
FIG. 6 illustrates an upper bracket of the type suitable for various embodiments of the present invention.

FIG. 6 shows an exemplary upper bracket 245 of the type suitable for various embodiments of the present invention including the embodiment shown in FIG. 5. The upper bracket 245 includes an upper horizontal section 250, a pair of angled sections 255-1 and 255-2 extending therefrom and a pair of vertical sections 260-1 and 260-2 extending therefrom. An opening 251 provides means for attaching the upper bracket 245 to a rigid member (e.g., ceiling beam) while openings 251-1 and 251-2 provide means for receiving bolts for supporting hangers. The vertical sections 260-1 and 260-2 may be fabricated of any length to allow multiple bolts to be joined for support of multiple hangers. For example, see FIG. 5 wherein the vertical sections of the upper bracket are extended and include six openings along their length allowing the upper brackets to support multiple bolts at various positions. As shown, the upper bracket 205 supports two bolts 225 and 230. FIG. 6 shows a potential extension 261 of vertical section 260-1 in dotted lines.

Figure 7:
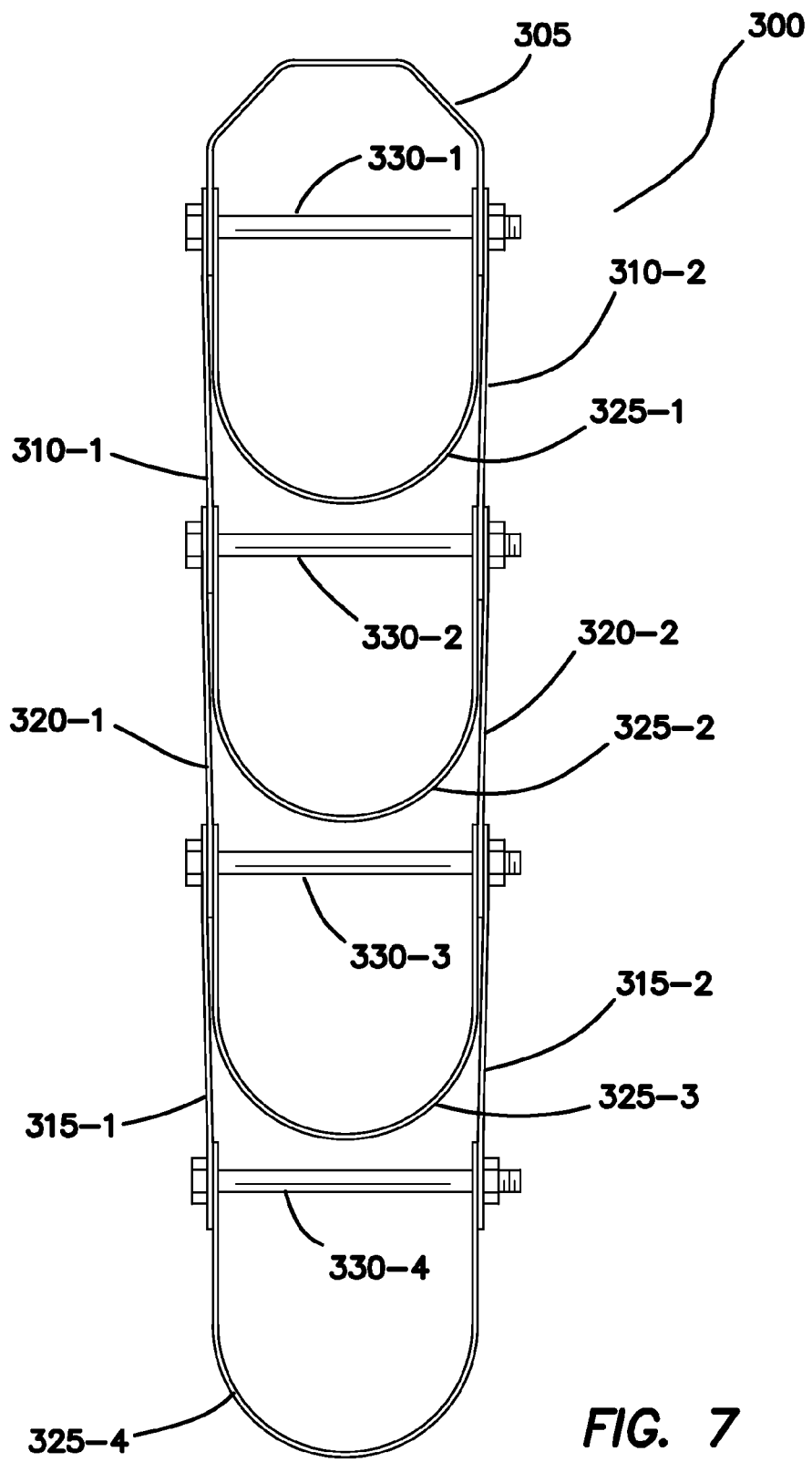
FIG. 7 third embodiment of a clevis hanger system according to the embodiments of the present invention.
Figure 8A:
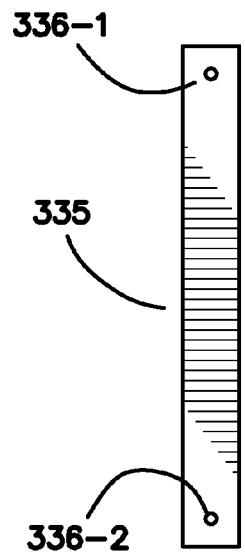
FIGS. 8a and 8b illustrate vertical slats used with various embodiments of the present invention.
Figure 8B:
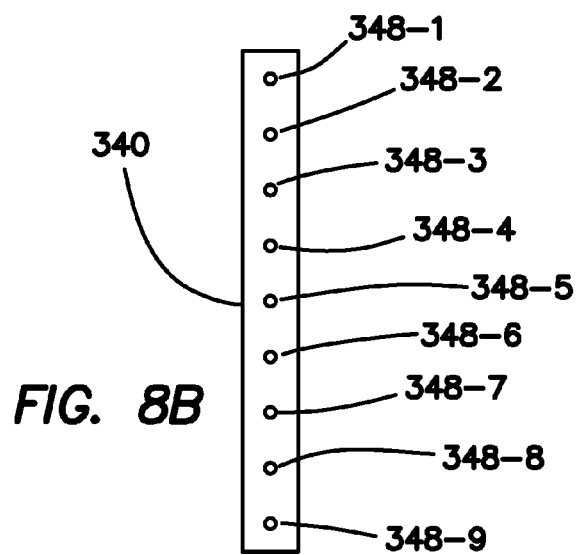

In another embodiment of the present invention, a clevis hanger system utilizes multiple vertical slats rather than an upper bracket having extending vertical sections. FIG. 7 shows a third embodiment of a clevis hanger system 300 utilizing vertical slats according to the embodiments of the present invention. With this embodiment, the clevis hanger system 300 includes an upper bracket 305, a first pair of vertical slats 310-1 and 310-2, a second pair of vertical slats 315-1 and 315-2, and a pair of intermediary connectors 320-1 and 320-2. Multiple pipe hangers 325-1 through 325-4 are received by multiple support rods 330-1 through 330-4. FIGS. 8a and 8b show two different vertical slat configurations 335 and 340. The first vertical slat 335 includes a pair of openings 336-1 and 336-2 while the second vertical slat 340 includes nine openings 348-1 through 348-9. In either instance, the vertical slats are able to support multiple hangers and, if desired, may be connected to additional vertical slats via said intermediary connectors.

Figure 9:
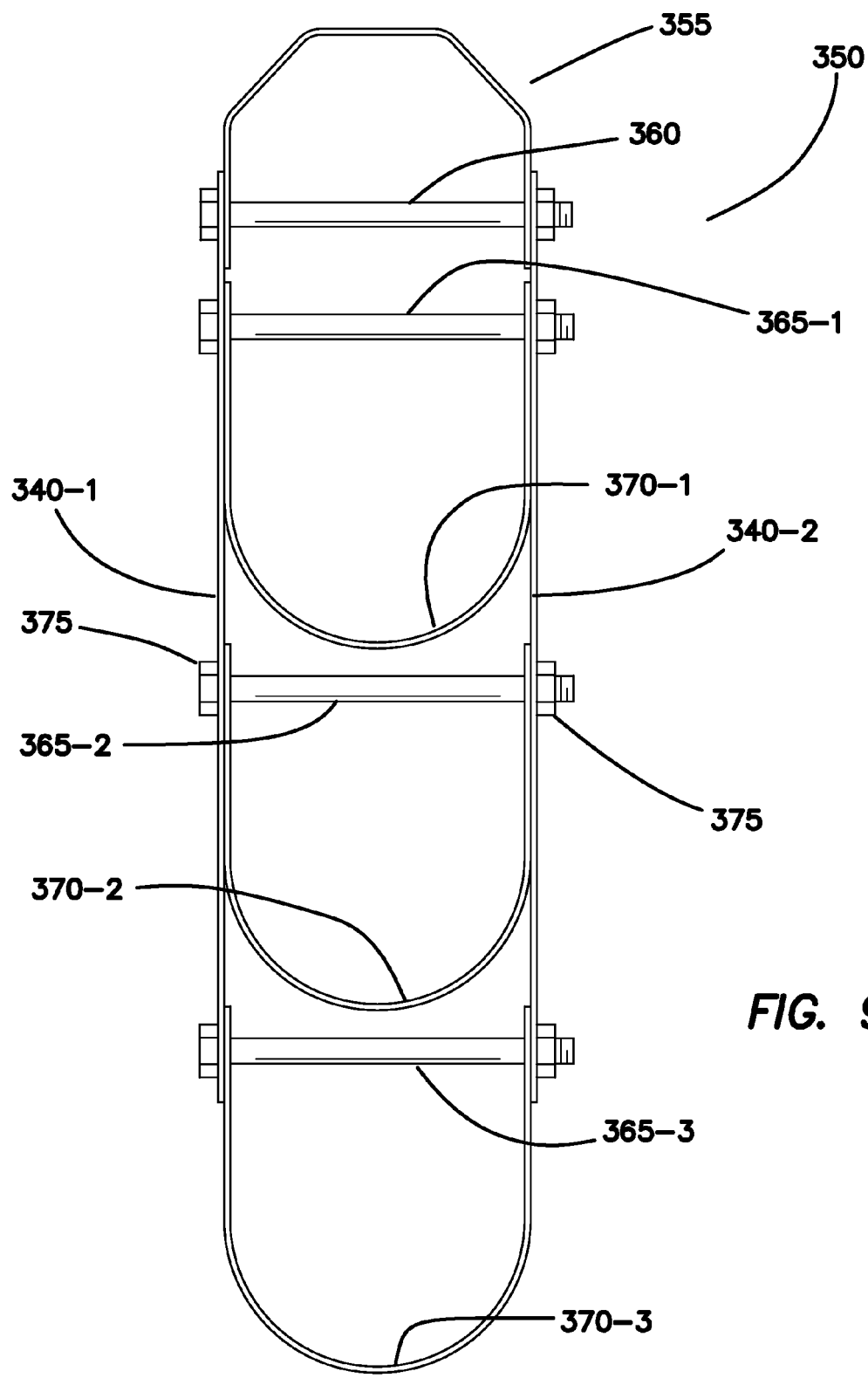
FIG. 9 illustrates a fourth embodiment of a clevis hanger system according to the embodiments of the present invention.

FIG. 9 shows a fourth embodiment of a clevis hanger system 350 according to the embodiments of the present invention. The clevis hanger system 350 utilizes vertical slats 340-1 and 340-2 connected to an upper bracket 355 via support rod 360. Support rods 365-1 through 365-3 each receive a pipe hanger 370-1 through 370-3. The support rods 360 and 365-1 through 365-3 are connected to the upper bracket 355 and vertical slats 340-1 and 340-2 via bolts 375.

Figure 10:
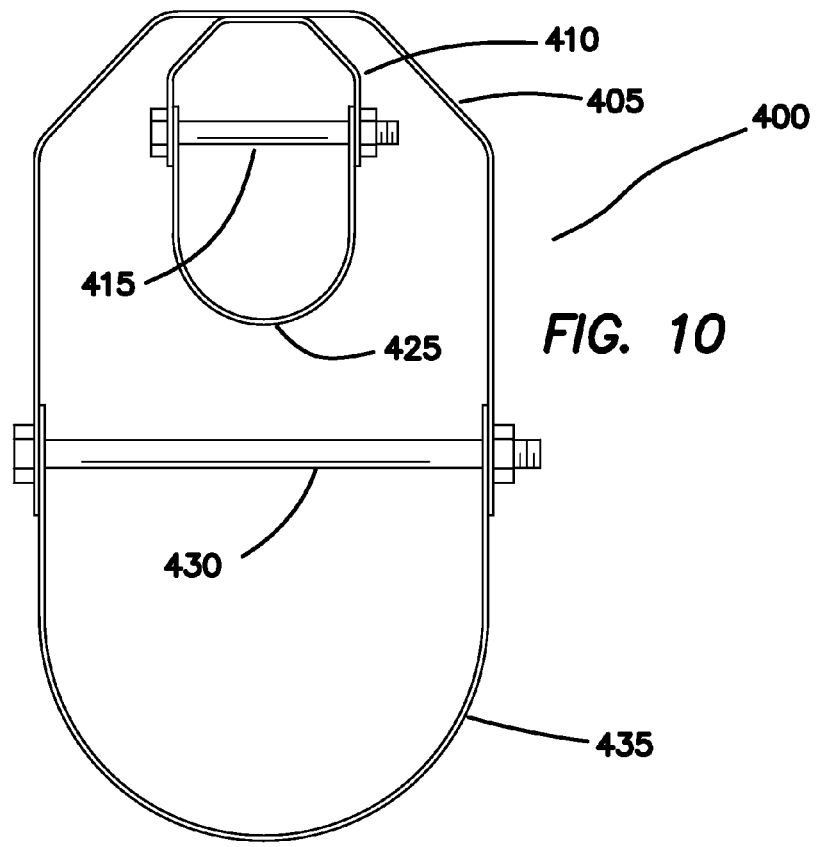
FIG. 10 illustrates a fifth embodiment of a clevis hanger system according to the embodiments of the present invention.

FIG. 10 shows a fifth embodiment of a clevis hanger system 400 according to the embodiments of the present invention. This embodiment includes multiple upper brackets 405 and 410 with a first upper inner bracket 410 connected to a support rod 415 receiving a first pipe hanger 425 and a second upper outer bracket 410 connected to a support rod 430 receiving a second pipe hanger 435.

Figure 11:
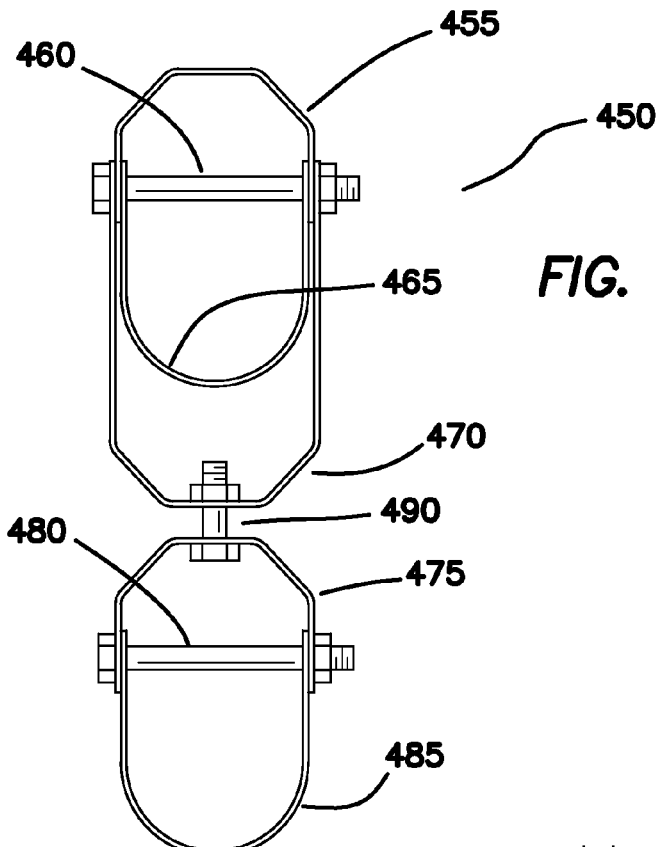
FIG. 11 illustrates a sixth embodiment of a clevis hanger system according to the embodiments of the present invention.

FIG. 11 shows a sixth embodiment of a clevis hanger system 450 according to the embodiments of the present invention. This embodiment includes a first upper bracket 455 connected to a first support rod 460 receiving a first pipe hanger 465, and a lower bracket 470 connected to a second upper bracket 475 connected to a second support rod 480 receiving a second pipe hanger 485. As shown, the second upper bracket 475 is connected to the lower bracket 470 via a nut and bolt arrangement 490.

Figure 12:
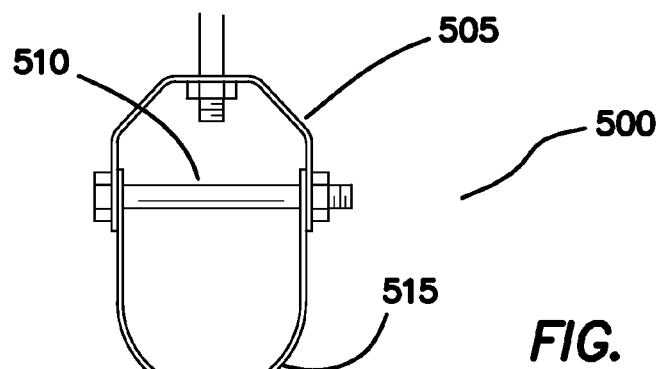
FIG. 12 illustrates a seventh embodiment of a clevis hanger system according to the embodiments of the present invention.

FIG. 12 shows a seventh embodiment of a clevis hanger system 500 according to the embodiments of the present invention. Clevis hanger system 500 includes a first upper bracket 505 connected to a first support rod 510 receiving a first pipe hanger 515 which connects to a second upper bracket 520 which is connected to a second support rod 525 receiving a second pipe hanger 530. As shown, the second upper bracket 520 is connected to the first pipe hanger 515 via a welded coupling 535. In other embodiments, different types of connectors are used.

Figure 13:
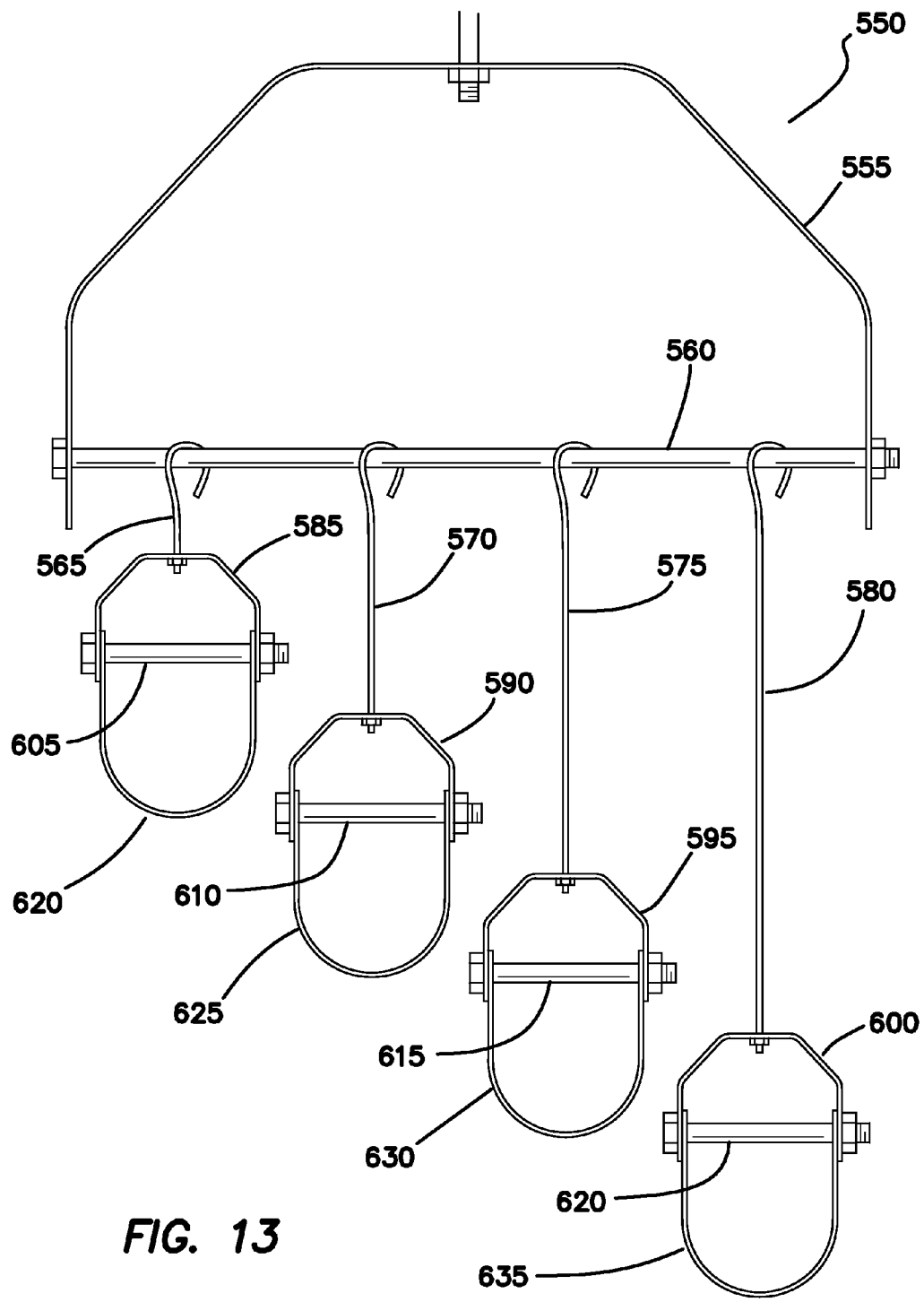
FIG. 13 illustrates an eighth embodiment of a clevis hanger system according to the embodiments of the present invention.

FIG. 13 shows an eighth embodiment of a clevis hanger system 550 according to the embodiments of the present invention. With this embodiment, an upper bracket 555 receives a support rod 560 which receives a series of rod and loop arrangements 565-580 each connected to an upper bracket 585-600 each connected to a support rod 605-620 each receiving a pipe hanger 625-640. As shown, each rod and loop arrangement 565-580 has a different length such that pipes at different elevations may be supported. In other embodiments, the rod and loop arrangements may have the same length.

Figure 14:
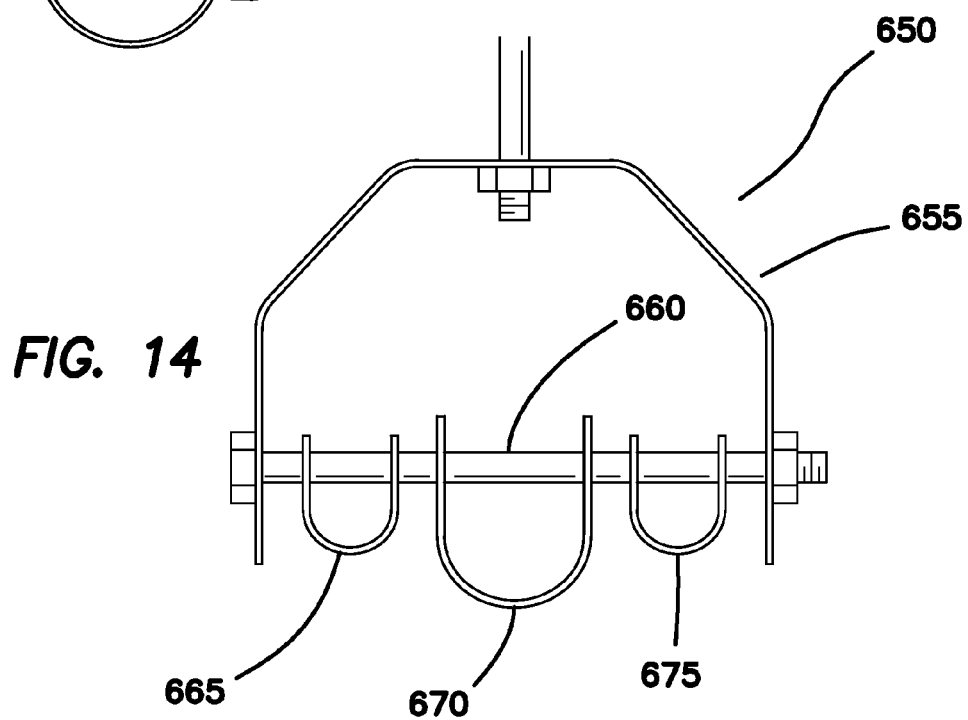
FIG. 14 illustrates a ninth embodiment of the a clevis hanger system according to the embodiments of the present invention.

FIG. 14 shows a ninth embodiment of a clevis hanger system 650 according to the embodiments of the present invention. With this embodiment, an upper bracket 655 is connected to support rod 660 which receives three pipe hangers 665-675 in a side-by-side relationship.

Figure 17:
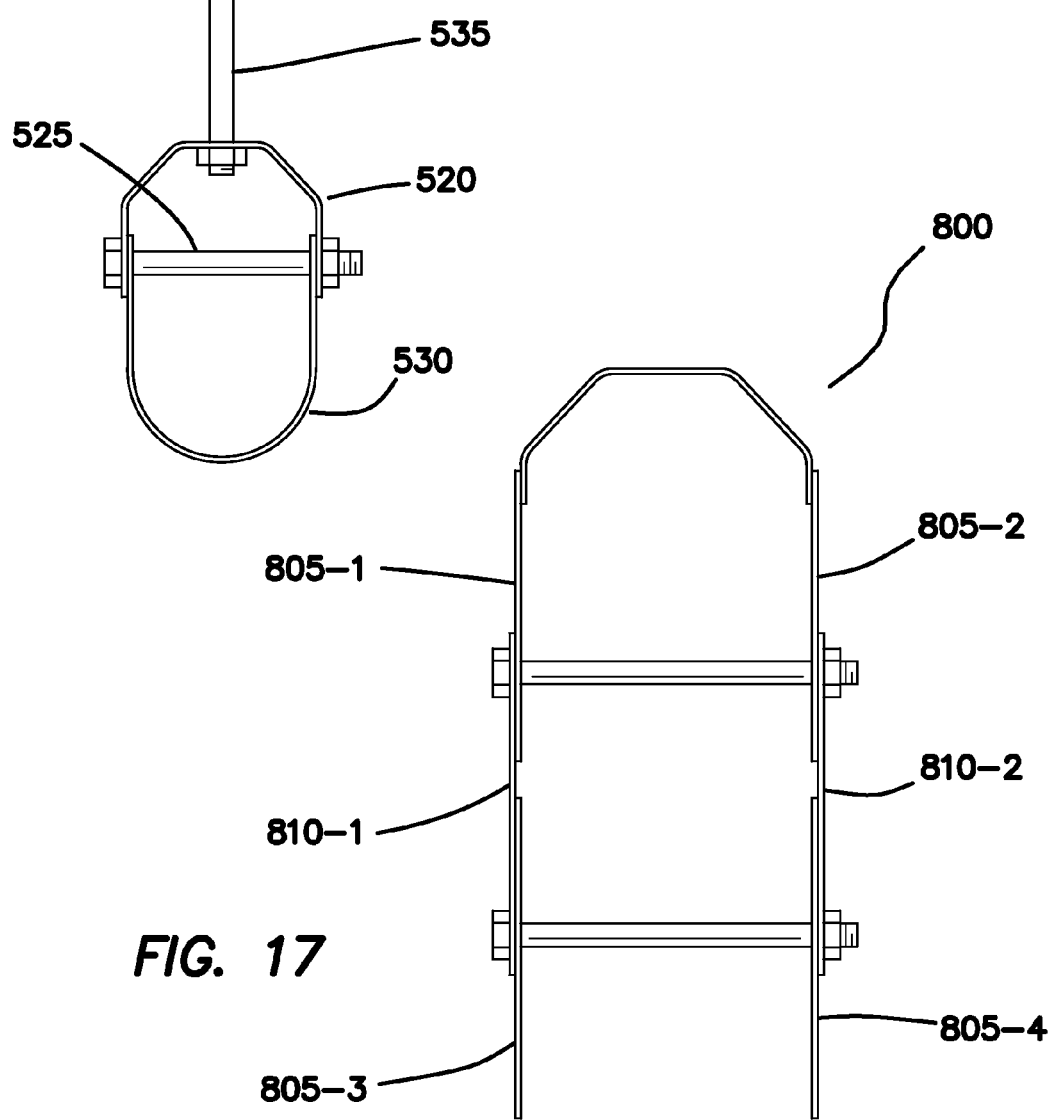
FIG. 17 illustrates a clevis hanger system using an I-beam sway bar according to the embodiments of the present invention.
Figure 15A:
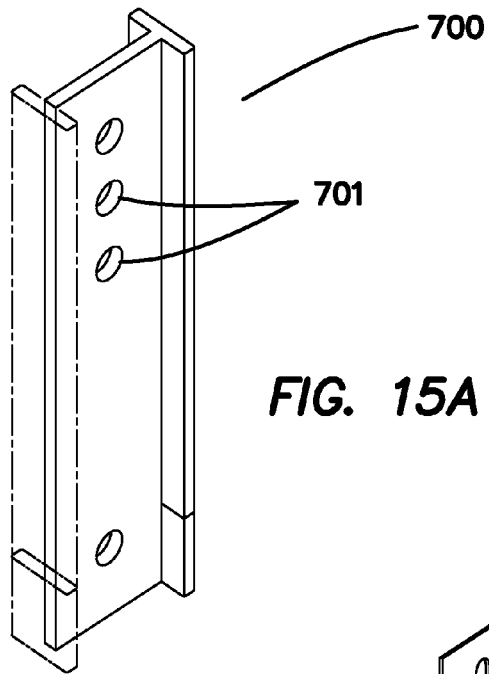
FIGS. 15a-15c show various components for use with various embodiments of clevis hanger systems according to the embodiments of the present invention.
Figure 15B:
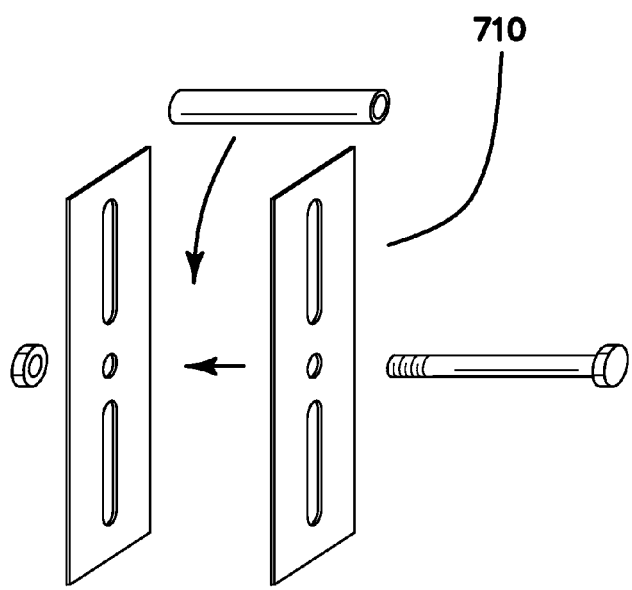
Figure 15C:
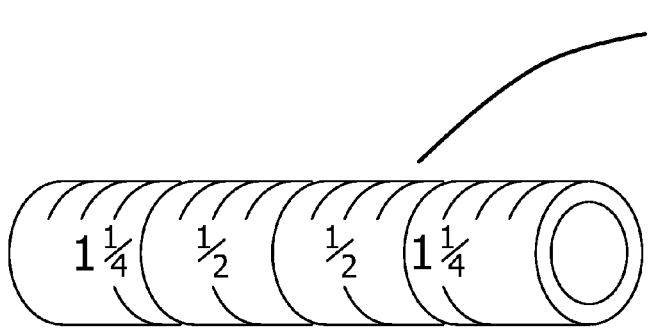
Figure 16:
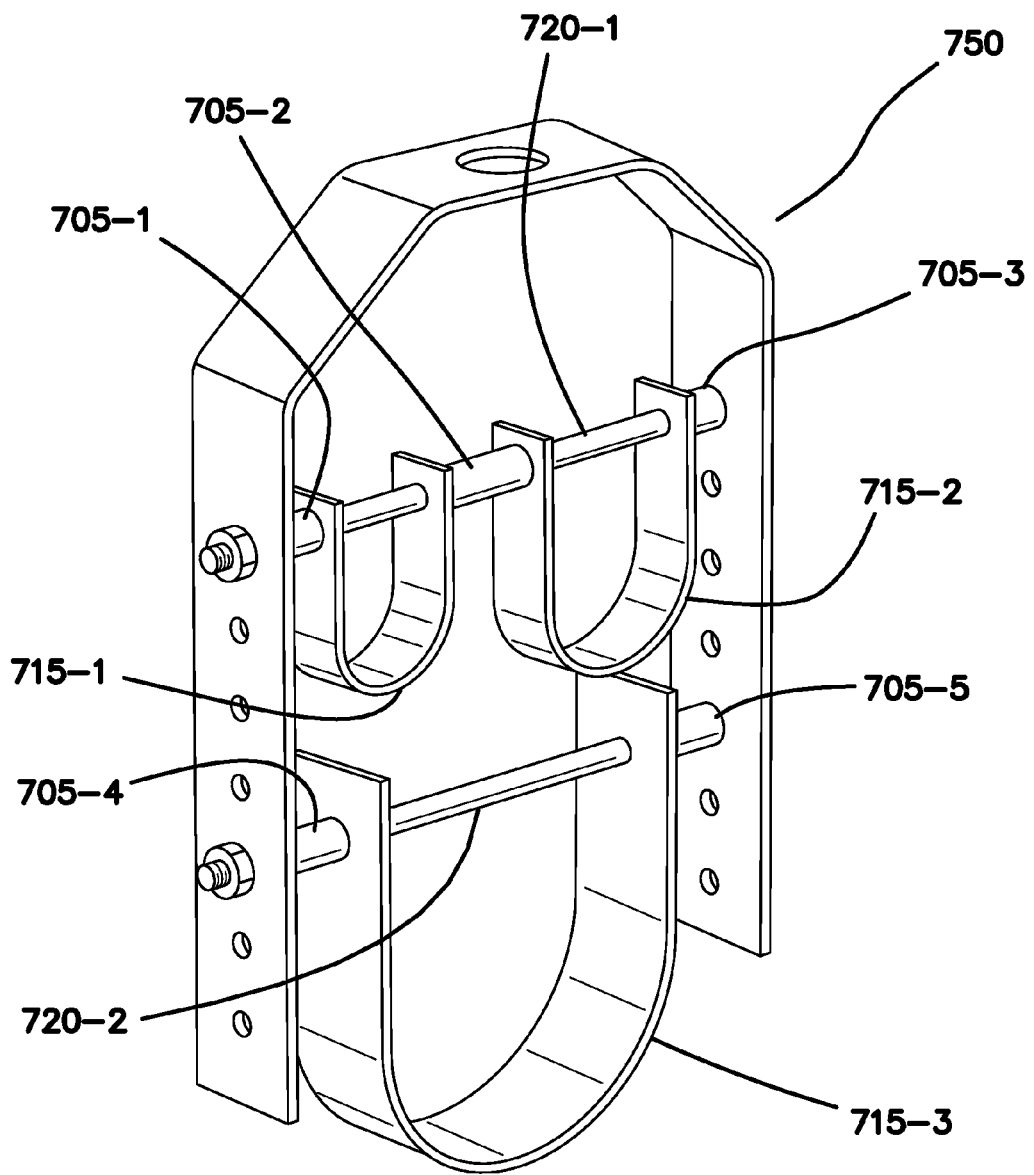
FIG. 16 illustrates a clevis hanger system using spacers according to the embodiments of the present invention.

FIGS. 15a-15c show an I-beam sway bar 700, spacer 705 and vertical plates 710. In one embodiment, the spacer 705 is pre-stressed at ¼ inch increments along its length allowing users to easily form a spacer of desired length. The I-beam sway bar 700 includes multiple holes 701 along a length thereof for allowing the I-beam sway bar 700 to be joined to a clevis hanger system as shown in FIG. 17. FIG. 16 shows a clevis hanger system 750 utilizing multiple spacers 705-1 through 705-5. The spacers 705-1 through 705-5 provide means for positioning pipe hangers 715-1 through 715-3 along support rods 720-1 and 720-2.

FIG. 17 shows a clevis hanger system 800 utilizing four I-beam sway bars 805-1 and 805-4 which receive two vertical plates 810-1 and 810-2. An upper bracket 825 is connected to two upper I-beam sway bars 805-1 and 805-2 which are connected to two lower I-beam sway bars 805-3 and 805-4 via said two vertical plates 810-1 and 810-2. The I-beam sway bars 805-1 and 805-4 and vertical plates 810-1 and 810-2 provide extra durability for seismic activity or other forces which act upon the structure in which the pipes are running.

Although the invention has been described in detail with reference to several embodiments, additional variations and modifications exist within the scope and spirit of the invention as described and defined in the following claims.

I claim:

1. A clevis hanger system comprising:
   an upper bracket having vertical sections;
   a first pair of vertical slats removably connected to said vertical sections of said upper bracket, said first pair of vertical slats including a series of spaced openings along lengths thereof;
   a first support rod connected to, and extending through, said upper bracket and said first pair of vertical slats via said spaced openings of said first pair of vertical slats;
   a second pair of vertical slats removably connected to said first pair of vertical slats, said second pair of vertical slats including a series of openings along lengths thereof;
   a second support rod connected to, and extending through, said first pair of vertical slats and said second pair of vertical slats via said spaced openings of said first pair of vertical slats and said spaced openings in said second pair of vertical slats, respectively; and
   at least two pipe hangers, a first pipe hanger having two spaced openings for insertion of said first support rod and a second pipe hanger having two spaced openings for insertion of said second support rod.

2. The clevis hanger system of claim 1 further comprising one or more spacers positioned on said one or more support rods.

3. A clevis hanger system comprising:
   an upper bracket having vertical sections;
   a pair of vertical slats removably connected to said vertical sections of said upper bracket to selectively extend a length of said vertical sections, said pair of vertical slats including a series of openings along lengths thereof; and
   at least two support rods, each of said at least two support rods extending through a different pair of aligned openings in said pair of vertical slats, each of said at least two support rods further supporting a pipe hanger, said pipe hangers having two spaced openings for insertion of said support rods for connection to said vertical slats, said pair of vertical slats extend between the at least two support rods, wherein the vertical slats are configured to support a plurality of support rods and pipe hangers.

\* \* \* \* \*